United States Patent
Obermeier et al.

(10) Patent No.: US 11,584,096 B2
(45) Date of Patent: Feb. 21, 2023

(54) METHOD FOR PRODUCING A VEHICLE COMPOSITE COMPONENT

(71) Applicants: Webasto SE, Stockdorf (DE); Covestro Deutschland AG, Leverkusen (DE)

(72) Inventors: Tina Obermeier, Stockdorf (DE); Harald Rasselnberg, Leverkusen (DE)

(73) Assignee: WEBASTO SE, Stockdorf (DE)

(*) Notice: Subject to any disclaimer, the term of this patent is extended or adjusted under 35 U.S.C. 154(b) by 0 days.

(21) Appl. No.: 17/368,373

(22) Filed: Jul. 6, 2021

(65) Prior Publication Data
US 2022/0055321 A1   Feb. 24, 2022

(30) Foreign Application Priority Data

Aug. 19, 2020   (EP) .................................. 20191663

(51) Int. Cl.
    B29C 70/34       (2006.01)
    B29C 70/48       (2006.01)
    (Continued)

(52) U.S. Cl.
    CPC ............ B29C 70/48 (2013.01); B29C 70/086 (2013.01); B29C 70/345 (2013.01); B29C 70/44 (2013.01);
    (Continued)

(58) Field of Classification Search
    CPC ... B29C 44/143; B29C 44/146; B29C 44/145; B29C 44/1228; B29C 44/1233; B29C 70/345
    See application file for complete search history.

(56) References Cited

U.S. PATENT DOCUMENTS 3,286,004 A * 11/1966 Hill ....................... B29C 44/145
                                                      264/46.7
4,130,614 A * 12/1978 Saidla ................... B29C 44/145
                                                      264/46.7
(Continued)

FOREIGN PATENT DOCUMENTS

DE    10 2012 013 538 B4    3/2019

OTHER PUBLICATIONS

Shinde, N.G., and D.M. Patel, A Short Review on Automobile Dashboard Materials, IOP Conferemce Seroes: Materials Science and Engineering, vol. 810 (2020), pp. 1-9 (Year: 2020).*

*Primary Examiner* — Matthew J Daniels
(74) *Attorney, Agent, or Firm* — Fitch, Even, Tabin & Flannery, LLP

(57) ABSTRACT

A method for producing a vehicle composite component with a layer structure having a core layer in a molding tool, the core layer being formed with regions of different thickness is provided. Steps for this method may include placing a cover layer, in particular a preformed cover layer, which in particular forms an outer skin of the vehicle composite component, onto a mold base plate of the open molding tool; introducing a first fiber layer, which is impregnated with PU resin and has not been subjected to forming, between the cover layer and a first mold counterplate of the open molding tool; closing the molding tool and compression molding the first fiber layer, which is impregnated with PU resin, against the cover layer, as a result of which a preform with a first support layer containing the first fiber layer is formed and hardened while supplying heat.

9 Claims, 4 Drawing Sheets

(51) Int. Cl.
  *B29C 70/08* (2006.01)
  *B29C 70/44* (2006.01)
  *B29C 70/54* (2006.01)
  *B29C 70/18* (2006.01)
  *B29L 31/30* (2006.01)

(52) U.S. Cl.
  CPC ............ *B29C 70/543* (2013.01); *B29C 70/18* (2013.01); *B29L 2031/30* (2013.01)

(56) References Cited

U.S. PATENT DOCUMENTS

| | | | | |
|---|---|---|---|---|
| 4,471,020 | A | * | 9/1984 | McCarthy .......... B29D 99/0025 |
| | | | | 264/257 |
| 4,937,028 | A | * | 6/1990 | Glemet ................ B29B 15/122 |
| | | | | 264/171.23 |
| 5,173,227 | A | * | 12/1992 | Ewen ................ B29C 44/1209 |
| | | | | 264/258 |
| 2002/0106952 | A1 | * | 8/2002 | Hashizume ....... B29C 45/14221 |
| | | | | 442/229 |

\* cited by examiner

METHOD FOR PRODUCING A VEHICLE COMPOSITE COMPONENT

CROSS-REFERENCE TO RELATED APPLICATION

This application claims priority from European Patent Application Number EP 20191663.2, filed Aug. 19, 2020, which is hereby incorporated herein by reference in its entirety for all purposes.

FIELD

The invention relates to a method for producing a vehicle composite component with a layer structure having a core layer in a molding tool, the core layer being formed with regions of different thickness.

Such a vehicle composite component is e.g. an outer surface part of a roof module or a trim component of a vehicle or else a cover of a roof opening system, such as a sliding roof or a spoiler roof, a roof element, e.g. of a hardtop convertible, or a luggage compartment loading floor.

BACKGROUND

DE 10 2012 013 538 B4 has disclosed a vehicle sandwich element which is produced by a method in which foamable material is injected between two cover layers. The two cover layers are kept at a distance from one another on opposite tool surfaces in a tool by means of a holding device, with the result that the foamable material can be injected into a free space between the two cover layers. The cover layers, which are preferably in the form of dry semifinished fibrous products, are thus fixed to the tool surfaces during the foaming operation and do not change position while being penetrated by foamable material and impregnated in the process and at the same time are fixedly connected to the foamed and hardened core of the sandwich element. Holding devices proposed are suction devices, devices which act with a magnetic force, mechanical holding devices with hooks or the like, or adhesive means.

SUMMARY

The invention is based on the object of specifying a method mentioned at the outset that is improved in terms of the production of a vehicle composite component having regions with considerably different component thicknesses over its surface extent.

This object is achieved in the case of the method mentioned at the outset by the steps mentioned below:
1.1 placing a cover layer, in particular a preformed cover layer, which in particular forms an outer skin of the vehicle composite component, onto a mold base plate of the open molding tool,
1.2 introducing a first fiber layer, which is impregnated with PU resin and has not been subjected to forming, between the cover layer and a first mold counterplate of the open molding tool,
1.3 closing the molding tool and compression molding the first fiber layer, which is impregnated with PU resin, against the cover layer, as a result of which a preform with a first support layer containing the first fiber layer is formed and hardened while supplying heat,
1.4 opening the molding tool and replacing the first mold counterplate with a second mold counterplate with a highly structured mold surface,
1.5 introducing a second fiber layer, which is impregnated with PU resin and has not been subjected to forming, between the preform arranged on the mold base plate and the second mold counterplate of the open molding tool,
1.6 closing the molding tool and injecting foamable PU between the first support layer of the preform and the second fiber layer, the PU foam forming the core layer pressing the second fiber layer against the second mold counterplate, which has a profiled mold surface, and shaping it thereon as a second profiled support layer,
1.7 opening the molding tool and removing the composite component formed.

Advantageous configurations of the invention are specified in the dependent claims.

In the case of the method according to the invention, the mold base plate is attached e.g. to a lower part of the molding tool and the mold counterplate is attached to a tool upper part. The opening and closing movement of the molding tool is expediently effected by a vertical movement of the tool upper part, which supports the mold counterplate. However, the molding tool may also have a left tool half and a right tool half, for example, which move the mold base plate and the mold counterplate toward one another in a horizontal opening and closing movement.

The first mold counterplate has a mold surface for shaping the inner or rear side of the preform. The preform contains the first support layer with the external cover layer, e.g. a thermoformed film which is based on a plurality of plastic layers, for example, or a coatable SMC shell.

The first support layer is formed by a first fiber layer, which is sprayed on one side or on both sides with polyurethane resin outside the molding tool by means of a spray head or the like. The first fiber layer is e.g. a loose layered arrangement of reinforcing fibers, such as glass fibers or a fiber mat or glass-fiber mat in the form of a bare ply without special three-dimensional forming, such that as a result no prefabricated shaping of the composite component is effected. The wet first fiber layer, which is impregnated with PU resin in this way and has not been subjected to forming, is placed into the open molding tool onto the cover layer.

The second mold counterplate molds the inner side of the composite component. For this purpose, the second mold counterplate has such a highly structured mold surface, and one which is three-dimensionally formed in such a way, that it makes it possible to produce regions of the composite component, such as e.g. raised component borders around the periphery or reinforcing ribs or the like, with a considerably greater component thickness than planar portions of the composite component formed with a lower thickness. In this respect, the second support layer, which has a highly contoured shape, is formed on the second mold counterplate by means of the second fiber layer.

The second fiber layer is impregnated with PU resin in a manner corresponding to the first fiber layer and is not subjected to forming, and in particular still wet with PU resin is introduced between the preform arranged on the mold base plate and the second mold counterplate of the open molding tool.

When, in the method sequence, the molding tool is closed and foamable PU is injected between the first support layer of the preform and the second fiber layer, the still-formable second fiber layer is pressed against the highly profiled or highly structured mold surface of the second mold counterplate and shaped thereon by the PU foam forming the core layer as the second profiled support layer and hardened while supplying heat.

The method according to the invention thus does not require any preformed second or inner fiber layer or any preformed second or inner support layer which predefine the shape of the composite component. By contrast, in the case of the method according to the invention, the forming of the second or inner support layer is performed in the molding tool and the component shape is created in this way.

Moreover, an extensive design freedom regarding the shape of the composite component is a significant advantage, since the three-dimensional design of the composite component is subject to virtually no limitation. Furthermore, the positional accuracy can be implemented with greater tolerances during the method sequence, e.g. during the operations of handling and positioning in the molding tool. The method steps are considerably reduced in comparison with methods with preformed cores, such as e.g. honeycomb or foam structures. The interior surface does not have any colored imprint or irregularities, and therefore no additional lamination of the inner surface is necessary.

In the case of the method, it is particularly preferred if the first support layer and the second support layer are pressed together at the edge and adhesively bonded with PU and enclose the core layer. In this way, for example, a solid and stiff flange can be formed at the edge or periphery of the composite component. As a result, the composite component is sealed and the narrow flange is matched to an imbricative arrangement of the composite component on the vehicle, thus forming a geometric transition to attachment parts and terminating with the seal of the vehicle.

Expediently, the first fiber layer and/or the second fiber layer are/is impregnated outside the molding tool by spraying PU resin on one side or on both sides.

According to a preferred method configuration, it is provided that unordered or ordered fibers or at least one fiber mat form/forms the first fiber layer or fiber ply and/or the second fiber layer or fiber ply, and that the fibers are in particular glass fibers. However, it is also possible in principle to use other reinforcing fibers, such as natural fibers or carbon fibers.

Furthermore, it may be provided that a spacer is applied to the preform arranged on the mold base plate and then the second fiber layer is introduced between the spacer and the second mold counterplate. During the subsequent closing of the molding tool, the spacer keeps the second fiber layer at a distance from the preform and in contact with the second mold counterplate. This provides the space into which foamable PU plastic is injected to produce the core layer of the composite component. The spacer remains in the core layer or in the PU foam.

The spacer is for example a self-inflatable film or a three-dimensionally deformable mat structure, e.g. composed of a plastic such as polyester.

BRIEF DESCRIPTIONS OF THE DRAWINGS

A method according to the invention for producing a vehicle composite component will be explained in more detail below with reference to the drawing, in which.

DETAILED DESCRIPTION

Figure 1:
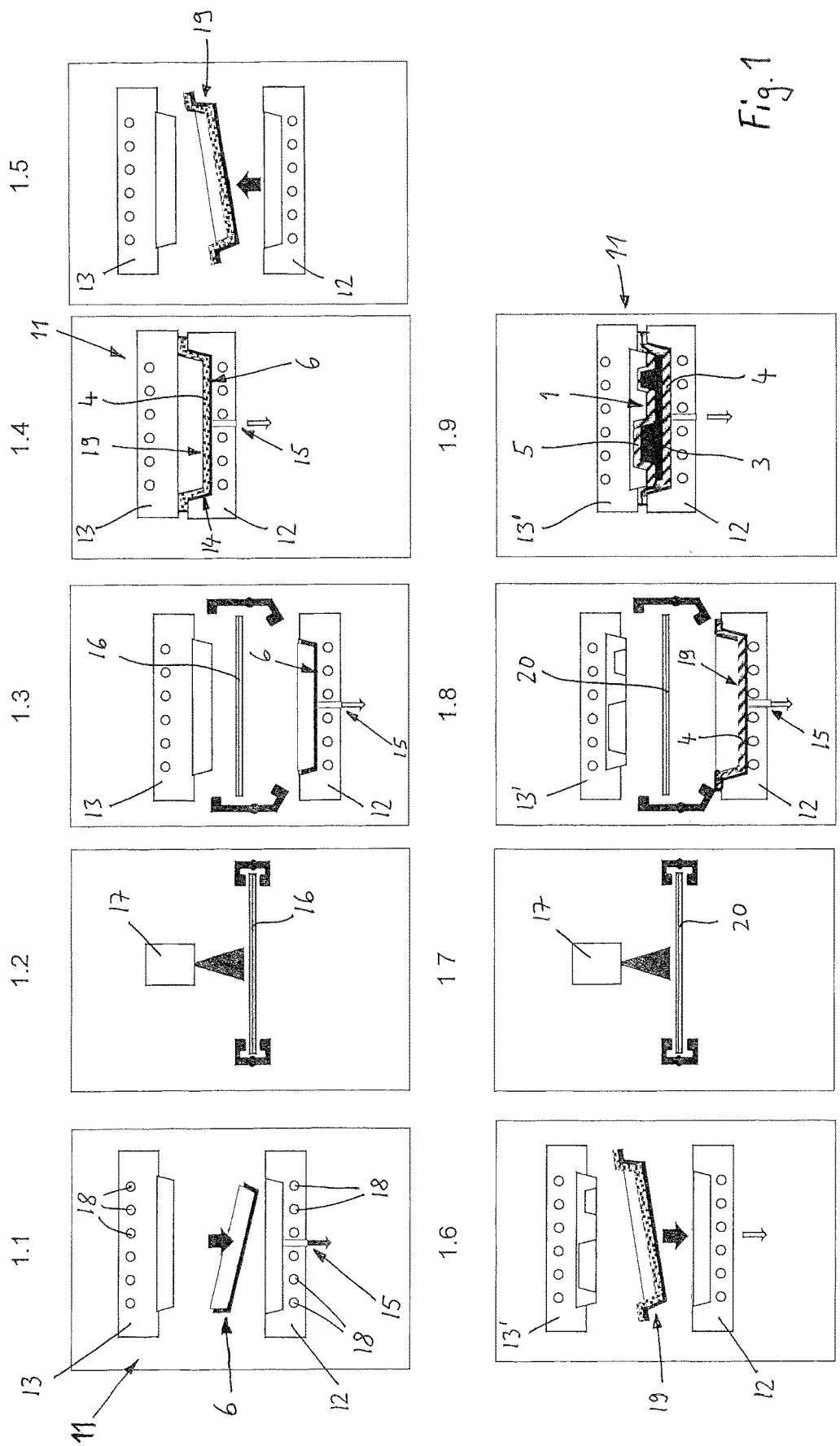
FIG. 1 shows, in schematic illustrations 1.1 to 1.9, a molding tool in a plurality of positions when carrying out a method for producing a vehicle composite component.

A vehicle composite component 1 (see FIG. 4) which forms, e.g., a vehicle outer surface component or a cover of a roof module, has a sandwich-like layer structure 2 with a polyurethane foam core or PU foam core as core layer 3. The core layer 3 is covered on one side by a first support layer 4 and on the other side by a second support layer 5. An outer cover layer 6 is located on the first support layer 4.

The first support layer 4 together with the cover layer 6 and the second support layer 5 form an edge region 7 of the component 1, the end of which is e.g. in the form of an in particular web-like flange 8. An edge portion 9 of the first support layer 4 and an edge portion 10 of the second support layer 5 are directly connected to one another at the edge region 7 and in particular at the web-like flange 8. The component 1 accordingly does not contain any core layer 3 in its edge region 7 or in the flange 8.

The first support layer 4 and the second support layer 5 are formed from fiber plies or fiber layers provided with PU resin. The fiber plies are formed e.g. from glass fibers and are in particular glass-fiber mats which have been wetted or impregnated as a result of being sprayed on one side or on both sides with PU resin before having been hardened as support layers in a molding tool under pressure and while supplying heat.

The cover layer 6 in particular forms an outer skin or outer side of the vehicle composite component 1.

The core layer 3 consists of a PU foam, which has been foamed in the molding tool from an injected PU plastic.

A method for producing a vehicle composite component 1 according to the invention will be explained below.

A molding tool 11 (see FIG. 1.1) has a mold base plate 12 and a mold counterplate 13 which form a mold cavity 14 when the molding tool 11 is closed. The mold base plate 12 is attached e.g. to a lower tool half of the molding tool 11 and the mold counterplate 13 is attached to the oppositely situated upper tool half.

When the molding tool 11 is open, the cover layer 6 comes to lie against the mold base plate 12 or is placed onto the mold base plate 12. The cover layer 6, which preferably forms an outer side or outer skin of the in particular planar vehicle composite component 1, is expediently preformed and matched to a shaping mold surface of the mold base plate 12. The cover layer 6 is e.g. a thermoformed film which is based on a plurality of plastic layers, for example, or a coatable SMC shell. The mold base plate 12 may have a negative-pressure device 15 which contains e.g. at least one suction channel, with the result that the cover layer 6 can be held by suction against the mold base plate 12 owing to negative pressure. Outside the molding tool 11 (FIG. 1.2), a first fiber layer 16 is sprayed on one side or on both sides with polyurethane resin by means of a spray head 17 or the like. The first fiber layer 16 is e.g. a loose layered arrangement of reinforcing fibers, such as glass fibers or a fiber mat or glass-fiber mat in the form of a bare ply without special three-dimensional forming, such that as a result no shaping of the component is effected. The first fiber layer 16, which is impregnated with PU resin in this way and has not been subjected to forming, is introduced into the open molding tool 11 (FIG. 1.3) and placed onto the cover layer 6, which is arranged on the mold base plate 12. The mold base plate 12 is preheated by means of a heating device 18 having e.g. heating channels arranged in the mold base plate 12.

Subsequently, the molding tool 11 is closed (FIG. 1.4) in that the two tool halves move the mold base plate 12 and the mold counterplate 13 against one another. In the process, while supplying heat, the first fiber layer 16, which is impregnated with PU resin, is compression-molded against the cover layer 6 into a layer-like composite, which forms a preform 19. The preform 19 contains the first support layer 4, which is formed by the first fiber layer 16, which is impregnated with the PU resin, and hardened while supplying heat. The PU resin of the first fiber layer 16 thus produces the intimate bond with the cover layer 6.

According to a first method alternative, after opening the molding tool 11 (FIG. 1.5), the preform 19 formed while supplying heat and under pressure is removed from the molding tool 11 or from the mold base plate 12 and inserted into a molding tool 11 (FIG. 1.6), which has an identical mold base plate 12 but has a second mold counterplate 13', which has a mold surface formed differently to that of the first mold counterplate 13, instead of the first mold counterplate 13, the mold surface of which is matched to the form of the cover layer 6.

According to a second method alternative, the preform 19 formed remains on the mold base plate 12 of the molding tool 11 after opening the molding tool 11, but the upper first mold counterplate 13 is replaced by a second mold counterplate 13' with a differently formed mold surface.

The upper second mold counterplate 13' has a mold surface which has a structured form such that the mold cavity 14 has a plurality of regions in which the spacings between the lower mold base plate 12 and/or between the inner surface of the preform 19 arranged thereon and the mold surface of the upper second mold counterplate 13' are considerably different. The composite component 1 is accordingly produced with regions of considerably different component thicknesses.

Produced outside the molding tool 11 is a second fiber layer 20, which is formed in the same way as the first fiber layer 16 (FIG. 1.7). The second fiber layer 20, which likewise is not specially preformed and is impregnated with PU resin, is introduced into the open molding tool 11 (FIG. 1.8) and placed on the preform 19, an edge portion of the second fiber layer 20 being in contact with an edge portion of the preform 19.

The molding tool 11 is closed (FIG. 1.9), the mold counterplate 13' and the mold base plate 12 pressing the edge portions of the second fiber layer 20 and of the preform 19 that lie on top of one another against one another. A foamable PU plastic is injected between the hardened first support layer 4 of the preform 19 and the still-formable second fiber layer 20, which is impregnated with PU. The pressure during the injection of the PU plastic and during the foaming of the PU foam presses the second fiber layer 20 against the second mold counterplate 13', which has a profiled mold surface, and shapes it thereon as a second profiled support layer 5. The PU foam forms the core layer 3 of the composite component 1 and is completely enclosed by the two support layers 4 and 5. The structured profiled mold surface of the second mold counterplate 13' makes it possible to produce composite components having large differences in thickness in different component regions, the core layer 3 forming the corresponding mold as a result of the foaming and not requiring any mechanical finishing, such as cutting or milling, of the foam in the process.

While supplying heat, the composite component 1 is hardened in the closed molding tool 11. The molding tool 11 is then opened and the composite component 1 formed is removed.

Figure 4:
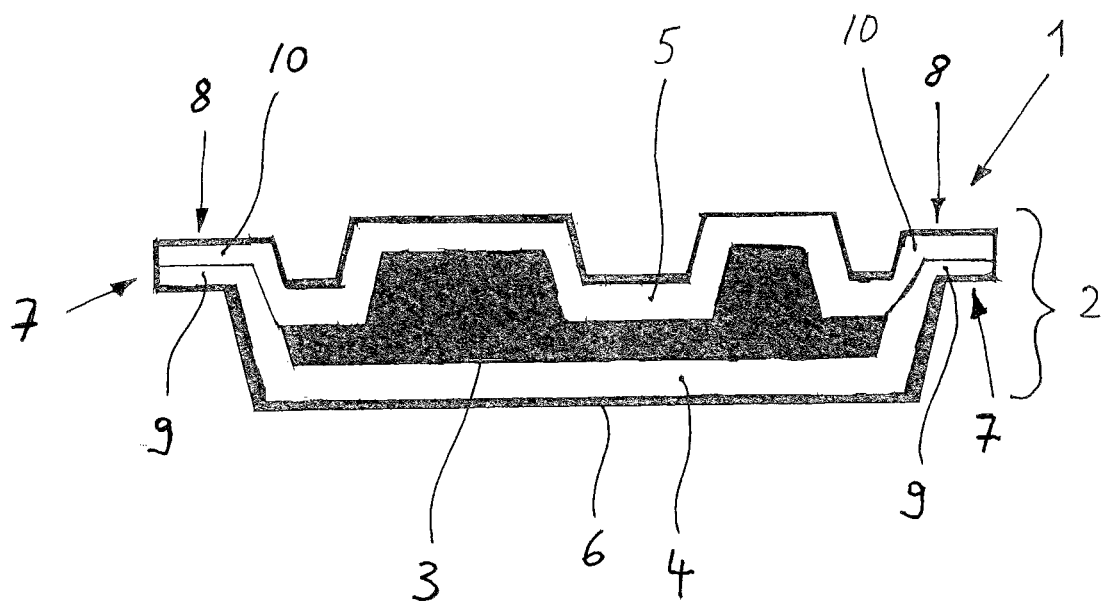
FIG. 4 shows, in a sectional view in a schematic illustration, a vehicle composite component produced according to the method.

The edge region 7 of the composite component 1 ends in the in particular web-like flange 8 (see FIG. 4). The edge portion 9 of the first support layer 4 and the edge portion 10 of the second support layer 5 are directly connected to one another at the edge region 7.

Figure 2:
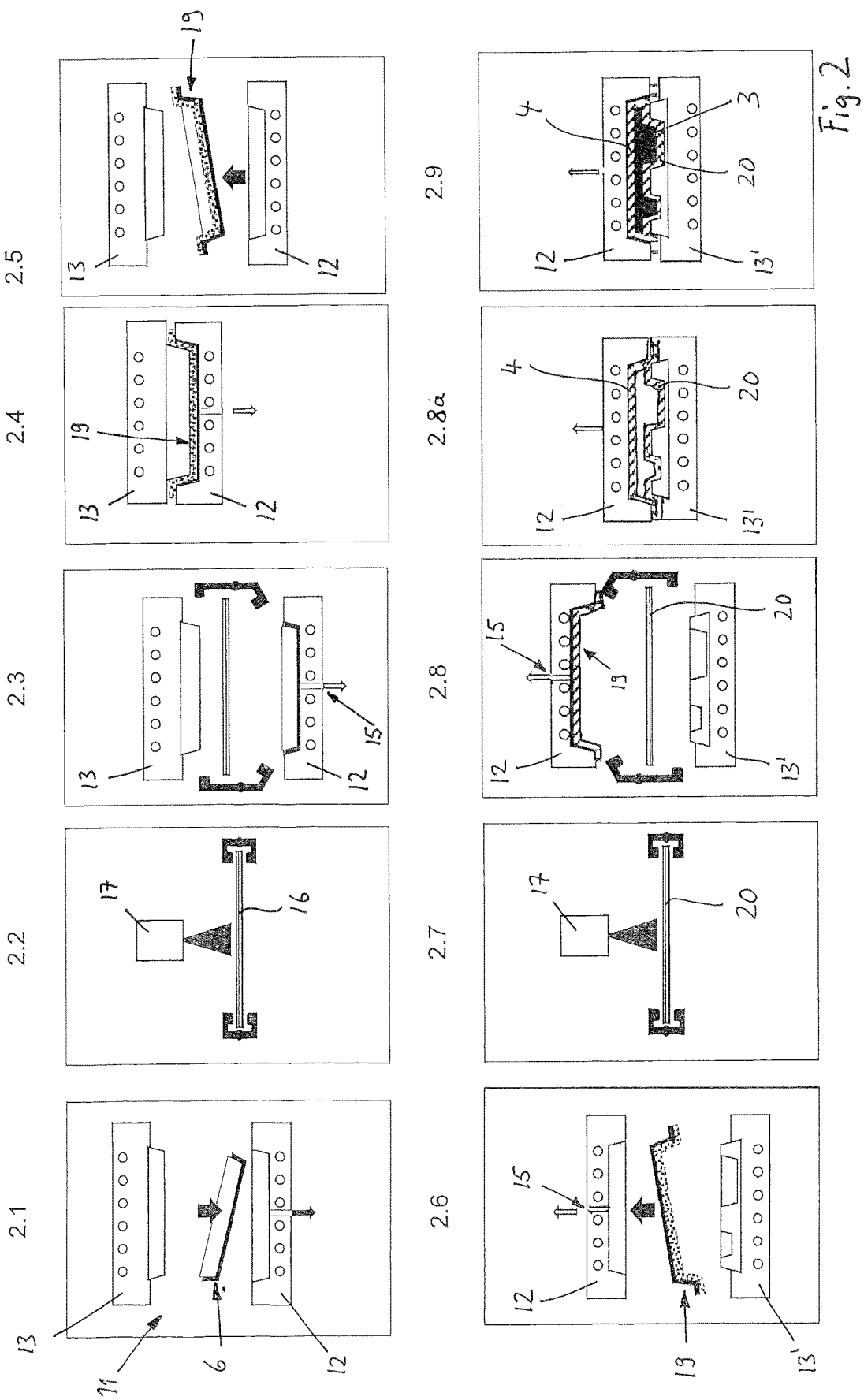
FIG. 2 shows, in schematic illustrations 2.1 to 2.9, the molding tool in a plurality of positions when carrying out a variant of the method for producing the vehicle composite component.

The method described above can be carried out with alternative method steps (see FIG. 2). The first method steps, illustrated in FIGS. 2.1 to 2.5, correspond to method steps 1.1 to 1.5 described above. After removing the preform 19 from the molding tool 11 or from the mold base plate 12 (FIG. 2.5), the molding tool 11 is modified or exchanged in such a way that the second mold counterplate 13' is arranged on the lower tool half of the molding tool 11 and the mold base plate 12 is arranged on the upper tool half (FIG. 2.6). The preform 19 is inserted into the open molding tool 11 and held by suction against the mold base plate 12 by means of the negative-pressure device 15.

As an alternative to this, the preform 19 formed remains in the closed molding tool 11 or, after the molding tool 11 is opened, on the mold base plate 12 of the molding tool 11, and when the molding tool 11 is being changed is furthermore held on the mold base plate 12, in particular by suction by means of an active negative-pressure device 15.

Furthermore (see FIG. 2.7, correspondingly FIG. 1.7), the second impregnated fiber layer 20 is produced outside the molding tool 11 and introduced into the open molding tool 11 (2.8) in which the preform 19 is held owing to negative pressure on the mold base plate 12 arranged on the upper tool half. When the molding tool 11 is being closed (FIG. 2.8a), the edge portions of the preform 19 and of the second fiber layer 20 are pressed against one another, while the preform 19 is furthermore held on the mold base plate 12 arranged at the top by means of negative pressure.

The injecting of the foamable PU plastic between the hardened first support layer 4 of the preform 19 and the still-formable second fiber layer 20 (see FIG. 2.9), which is impregnated with PU, and the shaping of the core layer 3 take place in a manner corresponding to the method step of the method described above that was explained with reference to FIG. 1.9.

Figure 3:
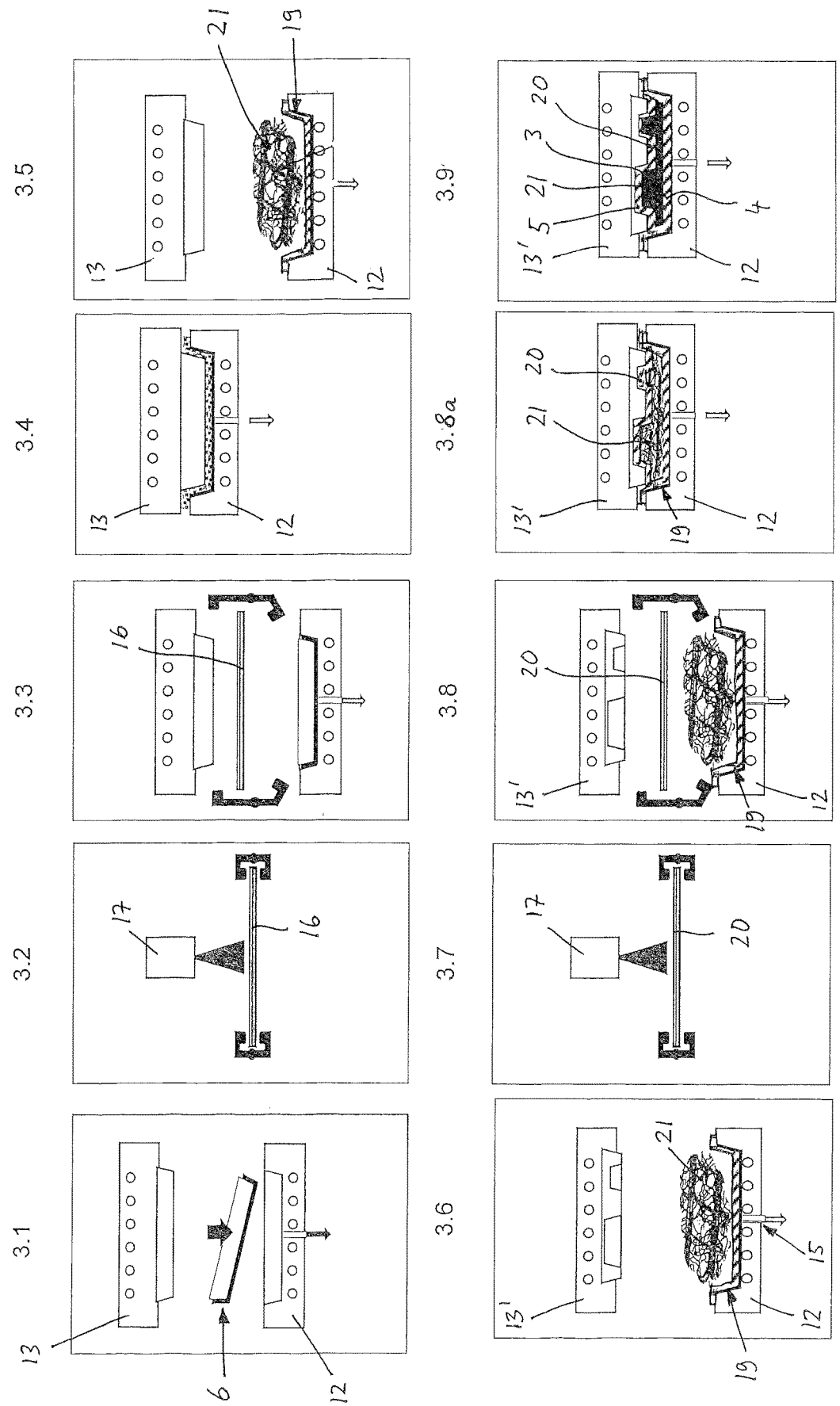
FIG. 3 shows, in schematic illustrations 3.1 to 3.9, the molding tool in a plurality of positions when carrying out another variant of the method for producing the vehicle composite component.

A further method alternative will be described with reference to FIGS. 3.1 to 3.9, method steps 3.1 to 3.4 corresponding to the method steps described with reference to FIGS. 1.1 to 1.4. These further method alternatives provide that, when the molding tool 11 is open (FIG. 3.5), a spacer 21 is placed onto the preform 19 held on the mold base plate 12. The mold counterplate 13 supported by the upper tool half is exchanged for the profiled mold counterplate 13' (FIG. 3.6).

The second fiber layer 20 (FIG. 3.7, correspondingly FIG. 1.7), which is produced outside the molding tool 11 and sprayed with PU resin, is introduced into the open molding tool 11 (FIG. 3.8) and placed on the spacer 21, which is arranged on the preform 19. The edge portion of the preform 19 is not covered by the spacer 21.

When the molding tool 11 is being closed (movement from FIG. 3.8 to FIG. 3.8a), the spacer 21 keeps the second fiber layer 20 at a distance from the preform 19, with the result that the second fiber layer 20 lies against the profiled mold counterplate 13', which moves in the closing direction.

A spacing or a cavity in which the spacer 21 is arranged thus remains between the second fiber layer 20 and the preform 19.

During the last closing movement of the molding tool 11, the mold counterplate 13' and the mold base plate 12 press the edge portions of the second fiber layer 20 and of the preform 19 that lie on top of one another against one another. The foamable PU plastic is injected between the hardened first support layer 4 of the preform 19 and the still-formable second fiber layer 20, which is impregnated with PU, into the spacing or cavity kept free by the spacer 21 (FIG. 3.9). The pressure during the injection of the PU plastic and during the foaming of the PU foam presses the second fiber layer 20, which already lies partially or fully on the mold counterplate 13', against the profiled mold surface of the second mold counterplate 13', and shapes it thereon as the second profiled support layer 5. The PU foam forms the core layer 3 of the composite component 1 and is completely enclosed by the two support layers 4 and 5.

The spacer 21 remains in the core layer 3 of the composite component 1.

While supplying heat, the composite component 1 is hardened in the closed molding tool 11. The molding tool 11 is then opened and the composite component 1 formed is removed.

The mold base plate 12 as well as the mold counterplates 13 and 13' may comprise the negative-pressure device 15 described, such that the parts lying thereon, like the cover layer 6, the preform 19 and the second fiber layer 20, can be held by means of a negative pressure or vacuum as required during the individual method steps.

The spacer 21 is e.g. a self-inflatable film or a three-dimensionally deformable mat structure.

When the molding tool is being closed, the self-inflatable film keeps the second fiber layer 20 at a distance from the preform 19 and preferably also in contact with the mold counterplate 13'. During the injection of the PU plastic and the foaming of the PU foam, said self-inflatable film is then punctured and remains in the core layer 3 of the composite component 1.

The three-dimensionally deformable mat structure preferably consists of plastics, such as e.g. polyester, with an open-pore structure.

| List of reference signs | |
|---|---|
| 1 | Vehicle composite component |
| 2 | Layer structure |
| 3 | Core layer |
| 4 | First support layer |
| 5 | Second support layer |
| 6 | Cover layer |
| 7 | Edge region |
| 8 | Flange |
| 9 | Edge portion |
| 10 | Edge portion |
| 11 | Molding tool |
| 12 | Mold base plate |
| 13 | Mold counterplate |
| 14 | Mold cavity |
| 15 | Negative-pressure device |
| 16 | First fiber layer |
| 17 | Spray head |
| 18 | Heating device |
| 19 | Preform |
| 20 | Second fiber layer |
| 21 | Spacer |

The invention claimed is:

1. A method for producing a vehicle composite component with a layer structure having a core layer in a molding tool, the core layer being formed with regions of different thickness, the method having the steps of:
placing a cover layer onto a mold base plate of the open molding tool,
introducing a first fiber layer, which is impregnated with PU resin, between the cover layer and a first mold counterplate of the open molding tool,
closing the molding tool and compression molding the first fiber layer, which is impregnated with PU resin, against the cover layer, as a result of which a preform with a first support layer containing the first fiber layer is formed and hardened while supplying heat,
opening the molding tool and replacing the first mold counterplate with a second mold counterplate has a different contour than the first mold counterplate,
introducing a second fiber layer, which is impregnated with PU resin, between the preform arranged on the mold base plate and the second mold counterplate of the open molding tool,
closing the molding tool and injecting foamable PU between the first support layer of the preform and the second fiber layer, the PU foam forming the core layer pressing the second fiber layer against the second mold counterplate, which has a profiled mold surface, and shaping the second fiber layer thereon as a second profiled support layer,
opening the molding tool and
removing the composite component.

2. The method as claimed in claim 1, wherein the first support layer and the second support layer are pressed together at the edge and adhesively bonded with PU and enclose the core layer.

3. The method as claimed in claim 1, wherein the first fiber layer and/or the second fiber layer are/is impregnated outside the molding tool by spraying PU resin on one side or on both sides.

4. The method of claim 1, wherein unordered or ordered fibers or at least one fiber mat form/forms the first fiber layer and/or the second fiber layer.

5. The method of claim 1, including a step of applying a spacer to the preform on the mold base plate prior to introducing the second fiber layer between the spacer and the second mold counterplate, wherein the spacer keeps the second fiber layer at a distance from the preform and in contact with the second mold counterplate.

6. The method as claimed in claim 5, wherein the spacer is a self-inflatable film or a three-dimensionally deformable mat structure.

7. The method of claim 1, wherein the cover layer is a preformed cover layer.

8. The method of claim 7, wherein the preformed cover layer forms an outer skin of the vehicle composite component.

9. The method of claim 4, wherein the fibers are glass fibers.

* * * * *